(12) United States Patent
Sanford et al.

(10) Patent No.: US 8,443,346 B2
(45) Date of Patent: May 14, 2013

(54) SERVER EVALUATION OF CLIENT-SIDE SCRIPT

(75) Inventors: Richard M. Sanford, Seattle, WA (US); Jennifer L. Kolar, Seattle, WA (US); Anthony Wiegering, Seattle, WA (US); Abdur Chowdhury, Oakton, VA (US)

(73) Assignee: AOL Inc., Dulles, VA (US)

( * ) Notice: Subject to any disclaimer, the term of this patent is extended or adjusted under 35 U.S.C. 154(b) by 1732 days.

(21) Appl. No.: 11/736,467

(22) Filed: Apr. 17, 2007

(65) Prior Publication Data

US 2008/0178162 A1    Jul. 24, 2008

Related U.S. Application Data

(60) Provisional application No. 60/885,585, filed on Jan. 18, 2007.

(51) Int. Cl.
*G06F 9/45* (2006.01)
*G06F 7/00* (2006.01)

(52) U.S. Cl.
USPC ............... 717/139; 717/138; 707/709

(58) Field of Classification Search ......... 717/139, 717/138; 707/709
See application file for complete search history.

(56) References Cited

U.S. PATENT DOCUMENTS

| | | | |
|---|---|---|---|
| 6,785,688 B2 | 8/2004 | Abajian et al. | |
| 6,842,761 B2 | 1/2005 | Diamond et al. | |
| 6,847,977 B2 | 1/2005 | Abajian | |
| 6,877,002 B2 | 4/2005 | Prince | |
| 6,938,170 B1 * | 8/2005 | Kraft et al. | 726/23 |
| 6,941,300 B2 | 9/2005 | Jensen-Grey | |
| 7,181,444 B2 | 2/2007 | Porter et al. | |
| 7,293,012 B1 * | 11/2007 | Solaro et al. | 1/1 |
| 7,308,464 B2 | 12/2007 | Nowitz et al. | |
| 7,519,902 B1 * | 4/2009 | Kraft et al. | 715/234 |
| 7,536,389 B1 * | 5/2009 | Prabhakar et al. | 1/1 |
| 2002/0099737 A1 | 7/2002 | Porter et al. | |
| 2002/0103920 A1 | 8/2002 | Berkun et al. | |
| 2004/0015398 A1 | 1/2004 | Hayward | |
| 2004/0045040 A1 | 3/2004 | Hayward | |

(Continued)

OTHER PUBLICATIONS

Lage et al. (Journal Data & Knowledge Engineering, vol. 49, 2004, p. 177-196).*

(Continued)

*Primary Examiner* — Li B Zhen
*Assistant Examiner* — Hang Pan
(74) *Attorney, Agent, or Firm* — Finnegan, Henderson, Farabow, Garrett & Dunner LLP

(57) ABSTRACT

A facility is described for server-side evaluation of client-side script, such as to crawl and index dynamically generated links. In various embodiments, the facility provides an object that emulates a browser object. The provided object exposes a function for performing steps comprising receiving a first link and storing the received first link in a list of links to be processed. The facility receives a second link to be processed, loads a second document identified by the received second link, and assigns the provided object to a global variable so that a script associated with the loaded second document invokes the function exposed by the provided object instead of a function with a similar name that is exposed by the emulated browser object. The function with the similar name exposed by the emulated browser object handles the received first link without storing it in the list of links to be processed.

17 Claims, 8 Drawing Sheets

U.S. PATENT DOCUMENTS

| | | |
|---|---|---|
| 2004/0051812 A1 | 3/2004 | Hayward |
| 2004/0064500 A1 | 4/2004 | Kolar et al. |
| 2007/0061700 A1* | 3/2007 | Kothari et al. ............ 715/505 |

OTHER PUBLICATIONS

Gosselin, D., "JavaScript Introductory," Appendix A, 2000, 21 pgs. Published by Course Technology.

Arasu, A. et al., "Extracting Structured Data from Web Pages," SIGMOD, Jun. 9-12, 2003, San Diego, CA, 12 pgs., ACM Press, New York.

Cho, J. et al., "Efficient Crawling Through URL Ordering," In proceedings of the seventh conference on World Wide Web,1998. 20 pgs.

Cho, J. "Parallel Crawlers," WWW2002, May 7-11, 2002, Honolulu, Hawaii, USA, 13 pgs., ACM Press.

Coffman et al., "Optimal Robot Scheduling for Web Search Engines," Journal of Scheduling, 1998, 22 pgs.

Grogan, M., "JSR 223: Scripting for the Java™ Platform," Java Community Process, http://jcp.org/en/jsr/detail?id=223, JSR Review Ballot, May 27, 2003, 7 pgs. [internet accessed on Feb. 22, 2008].

org.archive.crawler.extractor (Heritrix 1.13.1-200711160055), 2003-2007, 2 pgs. [Internet accessed from archive.org on Feb. 22, 2008].

JTidy, http://web.archive.org/web/20060421225521/http://jtidy.sourceforge.net, 4pgs. [internet accessed on Feb. 22, 2008].

Koster, M., "Guidelines for Robot Writers," http://www.robotstxt.org/guidelines.html, 1993, 4 pgs. [internet accessed on Feb. 22, 2008].

Press Release, "Microsoft Announces Steps to Address Eolas Patent Ruling," Redmond WA, Oct. 6, 2003, 2 pgs. [internet accessed on Feb. 22, 2008].

"Clean up your Web pages with HTML TIDY," http://www.w3.org/People/Raggett/tidy, 1994-2003, 13 pgs., [internet accessed Feb. 22, 2008].

YouTube—Broadcast Yourself, YouTube Essentials, Jun. 2006, http://web.archive.org/web/20060623223105/http://www.youtube.com/t/fact_sheet, 3 pgs. [internet accessed on Feb. 22, 2008].

* cited by examiner

SERVER EVALUATION OF CLIENT-SIDE SCRIPT

CROSS-REFERENCE TO RELATED APPLICATION(S)

This application claims priority to U.S. Provisional Application No. 60/885,585, filed on Jan. 18, 2007, entitled SERVER EVALUATION OF CLIENT-SIDE SCRIPT, which is herein incorporated by reference in its entirety.

BACKGROUND

The Internet has become a popular vehicle for sharing information. Using the Internet, a user has access to many millions of documents, such as Web pages, multimedia elements such as audio or audio/video files, images, and other information. Because locating information is problematic when such volumes of information are available, several Internet services provide a search capability. These services are commonly referred to as "search engines," examples of which include AMERICA ONLINE (AOL) search, GOOGLE search, and LYCOS search. These search engines typically employ a "Web crawler" to retrieve Web pages and index text contained therein; store links to images, audio files, audio/video files, and other multimedia or other types of information that cannot be easily indexed; and discover additional pages to crawl or index by analyzing the content of the crawled pages. The links that search engines store can be uniform resource identifiers (URIs). Search engines may crawl some or all Web sites from time to time, such as periodically or when notified of new Web pages.

When a user desires to locate information in the Internet, the user may employ one of these search engines. The user can provide search text or other criteria and the search engine can return a list of links matching the provided search text or criteria. As an example, when a user enters "whales" as search text, the search engine may provide a set of links to Web pages containing the word "whales," and also to multimedia elements having the word "whale" in their URI or other data associated with the multimedia elements.

Web pages sometimes contain links (e.g., URIs) to other documents or multimedia elements. As an example, a Web page relating to Alaska may contain links to other Web pages containing information about gray whales, Orca killer whales, and grizzly bears. A Web crawler that crawls and indexes the Web page relating to Alaska may add the links to the other Web pages to its queue of Web pages that are to be crawled and indexed. Thus, the crawler can then crawl and index the Web pages relating to gray whales, Orca killer whales, and grizzly bears. These Web pages may describe these creatures and provide pictures or other multimedia elements, such as videos, relating to these creatures. These Web pages may also have additional links to other Web pages containing additional information about these or other creatures. The Web crawler may iteratively crawl and index these additional links. Thus, a Web crawler can discover additional Web pages for crawling and indexing by following links contained in Web pages.

Web pages can generate links dynamically, such as by using a client-side script. A script is a set of instructions that a computer can execute. A script that is designed to execute at a client computing device rather than a server computing device is called a "client-side script." Web pages can employ various programming languages for client-side script, such as JAVASCRIPT, JSCRIPT, VBSCRIPT, and so forth. The script may generate a link based on various variables or user actions.

As an example, a Web page may provide a list of animals. When a user selects one of the animals, a client-side script contained by the Web page may dynamically generate a link (e.g., URI) based on the selected animal and display a multimedia element featuring the selected animal. Because client-side scripts typically cannot be executed by a server computing device outside the presence of a Web browser, conventional Web crawlers are unable to locate dynamically generated links, and are therefore unable to identify, index, or crawl documents located at these dynamically generated links.

DETAILED DESCRIPTION

Figure 1:
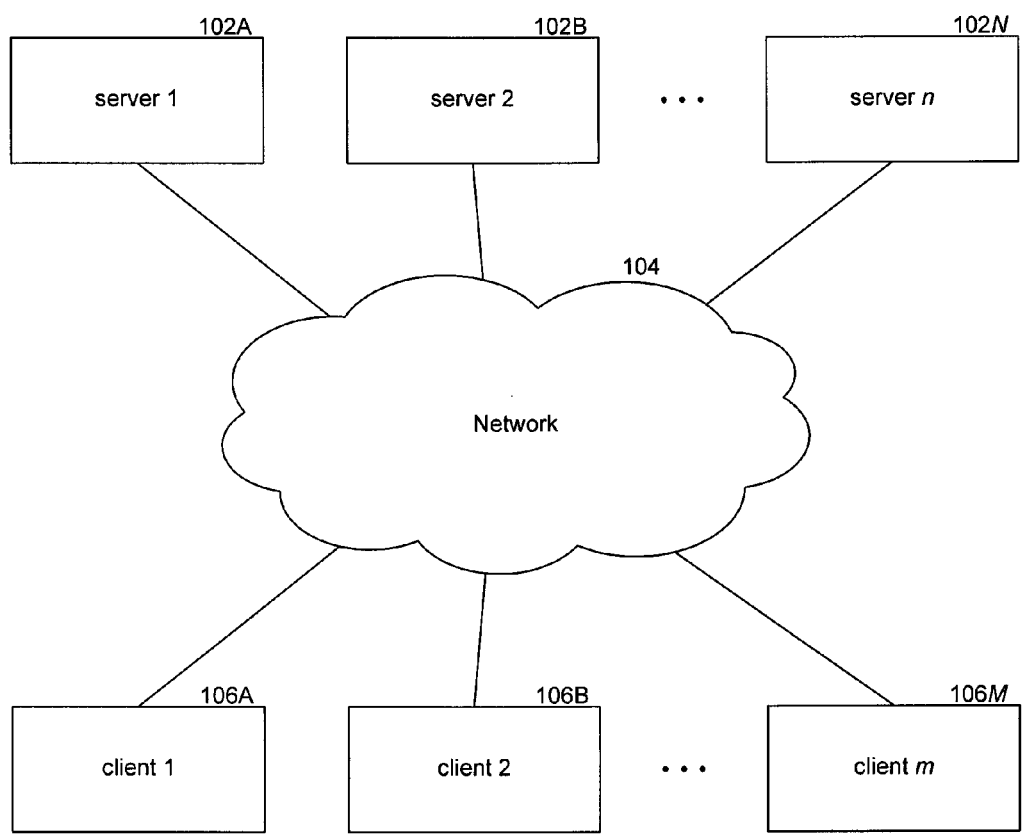
FIG. 1 is a block diagram illustrating an environment in which the facility operates in some embodiments.

A facility is provided for server-side evaluation of client-side script, such as to crawl and index dynamically generated links. In various embodiments, when a Web crawler associated with the facility detects client-side script, the Web crawler causes the client-side script to be executed by a server-side scripting engine. When the facility detects a dynamically generated link (e.g., URI), it adds the dynamically generated link to a queue (e.g., a list) of links that the Web crawler is to process, such as by crawling and indexing contents of the linked document. As an example, an OnClick method in a script may assemble a URI based on user input. When the facility executes the script, the facility detects the assembled URI and adds the assembled URI to the list of links to be crawled. Thus, the facility is able to crawl and index dynamically generated links.

Conventionally, client-side scripts may not be executable by a server computing device because the client-side scripts may reference objects (e.g., browser objects) that are associated with an Internet browser. Examples of browser objects are Window, Location, Navigator, Cookie, and Document. A framework associated with Internet browsers provides these browser objects to scripts so that the scripts can access browser-related functionality. As examples, the Window browser object enables scripts to open and close windows and the Location browser object enables scripts to cause the Internet browser to download a document identified by a link. When a script engine located at a server computing device executes client-side script, it can either execute the scripts within the context of an Internet browser or provide functionality that is equivalent to the browser objects. By providing functionality that is equivalent to the browser objects, Internet browser-related overhead (e.g., processing, memory, etc.) can be reduced. The facility provides objects (e.g., written using the JAVA programming language) that offer functionality that is equivalent to the browser objects. The objects provided by the facility are exported to the script engine as global variables. These global variables are given the same names as the browser objects. As examples, the global variables are Window, Location, Navigator, Cookie, and Document. When a script attempts to instantiate or employ a browser object on the server computing device, the script employs the global variables instead. Thus, the script engine can execute client-side script at the server without modification by employing objects the facility provides that each emulate a corresponding browser object.

The objects the facility provides intercept various method invocations to determine whether a link (e.g., a URI) is being provided as a parameter. The link provided as a parameter may be dynamically created by the script. When the objects detect that a link is being provided, they add the provided link to a list of links that the facility is to crawl. As an example, client-side script can employ a window.open method to create a window and load a document into the window. The method accepts a URI as a parameter and loads the provided link. The Window object the facility provides overrides its open method to add the provided link to the list of links to crawl. Thus, when a script invokes window.open, the facility adds the link to the list of links to crawl.

In various embodiments, the facility downloads a document indicated by a URI that is listed or queued to be crawled and employs a markup language sweeper component to make the downloaded document "well formed." A document is well-formed when every opening tag in the document has a corresponding closing tag. As an example, a document that contains only a <HTML> tag that opens an HTML element is not well-formed unless that document also has a </HTML> tag that closes the HTML element. The markup language sweeper component can remove or inject tags, as necessary, to make the document well-formed.

In some embodiments, the facility constructs a document object model (DOM) representation of the document. As an example, the facility can use a DOM object to construct the DOM representation. The DOM representation of a document provides a hierarchical representation of elements the document contains. The facility can employ the DOM object to create and manage the DOM representation. The DOM representation of the document can be searched, such as to identify script tags, or modified, such as to add or remove elements.

For every script tag that is located in the DOM representation of the document, the facility can download and execute script that is referenced by a link that is contained in the script tag. As an example, a script tag may indicate a URI at which a script is located. The facility then executes script contained between the opening and closing script tags. A document can contain multiple script tags. In some embodiments, the script is executed in the order in which it is found in the document because that is how most Internet browsers conventionally execute scripts.

When a script modifies the DOM, such as to indicate links, the objects referenced by the global variables intercept the DOM modifications and add the indicated links to a list of links that are to be crawled. As an example, a script can invoke the window.open method and provide a dynamically generated link. The Window object the facility provides intercepts the open method invocation and stores the provided link in the list of links to be crawled by the facility.

In some embodiments, the facility handles script events after the scripts have been executed. A script event is an event for which the script provides a handler routine. The event can be generated based on user actions. As examples, a script can provide handlers to handle mouse movements, mouse clicks, and so forth. The facility can handle the script events after executing scripts because Internet browsers generally execute the scripts before users can take any action. As an example, the facility can handle OnClick, OnLoad, OnMouseMove, OnUnload, and other events after executing scripts. In various embodiments, some events may be handled but not others. As an example, events that are more likely to identify URIs may be handled but not other events that are less likely to identify URIs. The events that are to be handled may be stored in a list of events so that the facility can be tuned over time to handle more or fewer events. To handle events, the facility executes routines the respective event handlers provide.

The following simple example illustrates how the facility can be employed. Suppose a Web page contains the following:

```
<script>
  function showPage (id) {window.open('/show?id='+id);}
</script>
...
<img src = 'image.tiff' alt='Image'
onClick='showPage('123');/>
```

A conventional Web crawler would recognize 'image.tiff' as an image, but may miss the page "/show?id=123". Some conventional Web crawlers may even interpret the link as "/show?id='+id" which is an invalid expression. In contrast, because the facility has executed the client-side script at the server, the facility would correctly identify the link as "/show?id=123" and identify that page for crawling.

In various embodiments, the facility can provide various artificial inputs to event handlers. As an example, the facility can create a set of artificial mouse events when a script provides mouse handling events. The artificial mouse events the facility can provide include simulating the movement of a mouse pointer, selecting a region by simulating a mouse click, and so forth. As another example, the facility can provide artificial inputs for standard form fields, such as cities, states, postal codes, telephone area codes, artist names, song names, movie titles, software titles, dates, times, and so forth, such as when a script handles a form. In various embodiments, the facility can select artificial inputs randomly, sequentially, or in any other manner. As examples, the facility can attempt all or some known or unknown options.

The facility will now be described with reference to the figures. FIG. 1 is a block diagram illustrating an environment in which the facility may operate in some embodiments. The environment includes one or more server computing devices, such as server 1 102A, server 2 102B, and server n 102N. The servers may be connected via a network 104 to one or more client computing devices, such as client 1 106A, client 2 106B, and client m 106M. The network 104 may be an intranet, the Internet, or any other type of network. The server and client computing devices may be any sort of computing device, such as rack-mounted computers, desktop computers, portable computers, and so forth. The servers can crawl Web pages or other documents, store indices, store Web pages or other documents, and so forth. Users generally employ the client computing devices to view documents. Some servers can be servers for some operations (e.g., crawling and indexing) and clients for others (e.g., loading Web pages for crawling).

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different computing devices may be used in place of the Web client computing devices, such as mobile phones, personal digital assistants, televisions, cameras, etc.

Figure 2:
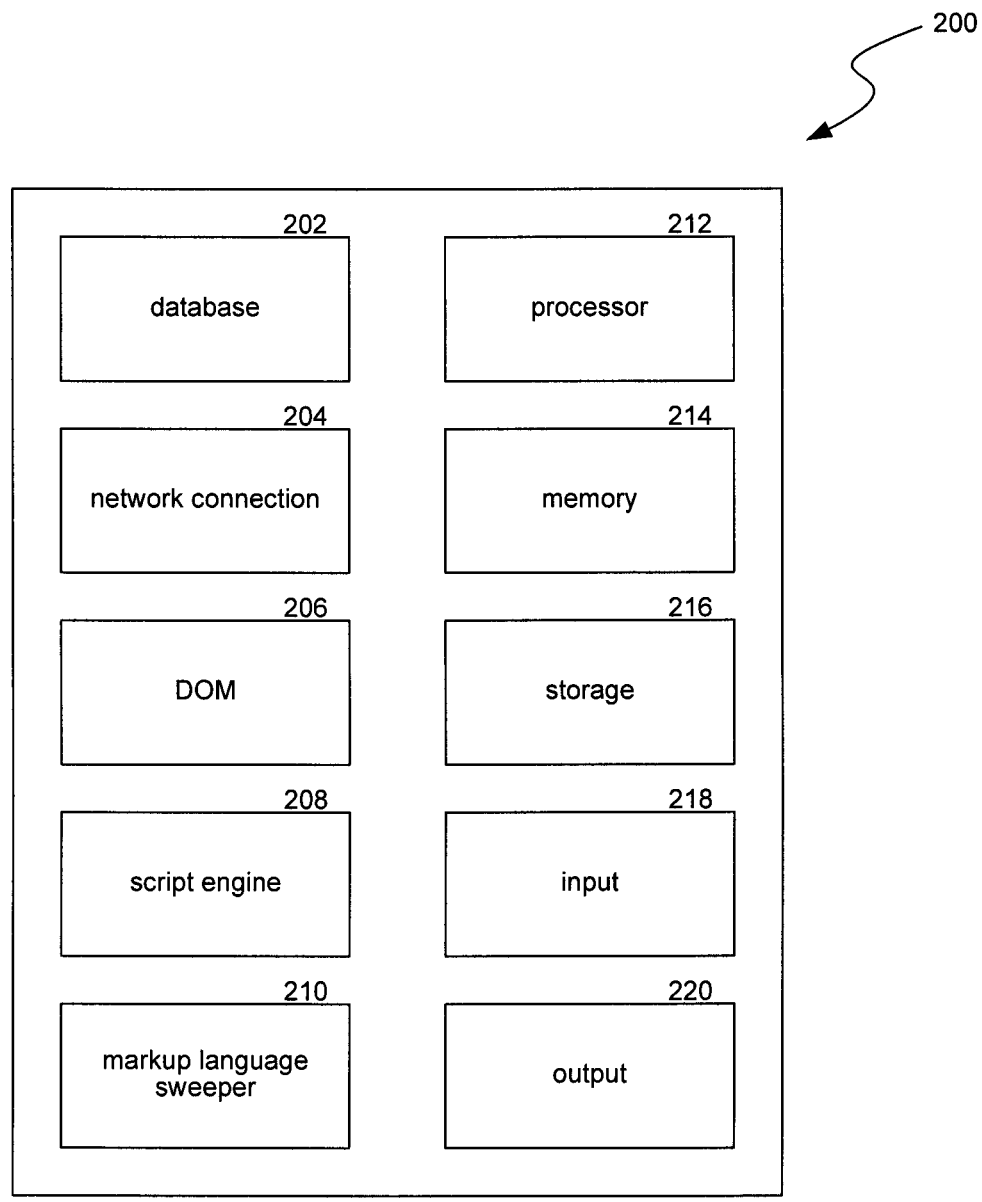
FIG. 2 is a block diagram illustrating components associated with a server computing device in various embodiments.

FIG. 2 is a block diagram illustrating components associated with a server computing device in various embodiments. The server computing device 200 may include a database 202, a network connection 204, a DOM component 206, a script engine 208, and a markup language sweeper component 210. The server 200 may also include standard components associated with computing devices, such as a processor 212, a primary memory 214, a secondary memory (e.g., storage) 216, an input device 218 and an output device 220. The primary memory or secondary memory are types of computer-readable media that can store data, computer-executable instructions, or both. In various embodiments, the server computing device may include 0, 1, or more of any of these components. In some embodiments, components 202-210 are software components that are stored in storage 216.

In some embodiments, the database 202 stores information about Web pages that the facility has indexed. As an example, the database stores an index of words the indexed Web pages contain. The database may also contain a list of links to multimedia segments, such as videos linked by the Web pages. In various embodiments, the database can be stored in storage 216 or may be stored in a storage associated with another computing device. The server 200 may employ the network connection 204 to communicate with other computing devices, such as client computing devices. The network connection can be wired, wireless, or any other type of network connection.

The DOM component 206 loads a document, such as a Web page, and populates or constructs a DOM object. The DOM object may have an associated application program interface (API) using which another software component can manipulate the DOM object, such as to add, remove, or modify elements. As an example, another software component, such as a script engine, may employ the API to analyze the constructed DOM, such as to analyze contents of the document. In some embodiments, the API may expose the DOM as a tree in such a manner that another software component can analyze each node of the tree to determine which tags or elements the document contains.

The database 202 can be manipulated via a database management software, such as MSQL, ORACLE, or MICROSOFT SQL SERVER database management software.

The script engine 208 is a component that executes various scripts. As an example, the script engine can execute Javascript, Jscript, VBscript, etc. The script engine can be invoked by a software component that provides script for the script engine to execute, such as a Web crawler.

The markup language sweeper component 210 can manipulate a document to make it well-formed. A document is well-formed when every opening tag in the document has a corresponding closing tag. As an example, a document that contains only a <HTML> tag is not well-formed unless that document also has a </HTML> tag that closes the HTML element. The markup language sweeper can open a document and remove or inject tags, as necessary, to make the document well-formed. An example of a markup language sweeper is JTIDY, which is presently available at a website hosted by SOURCEFORGE.NET.

The processor 212, memory 214, storage 216, input 218, and output 220 can be components associated with various types of computing devices.

Figure 3:
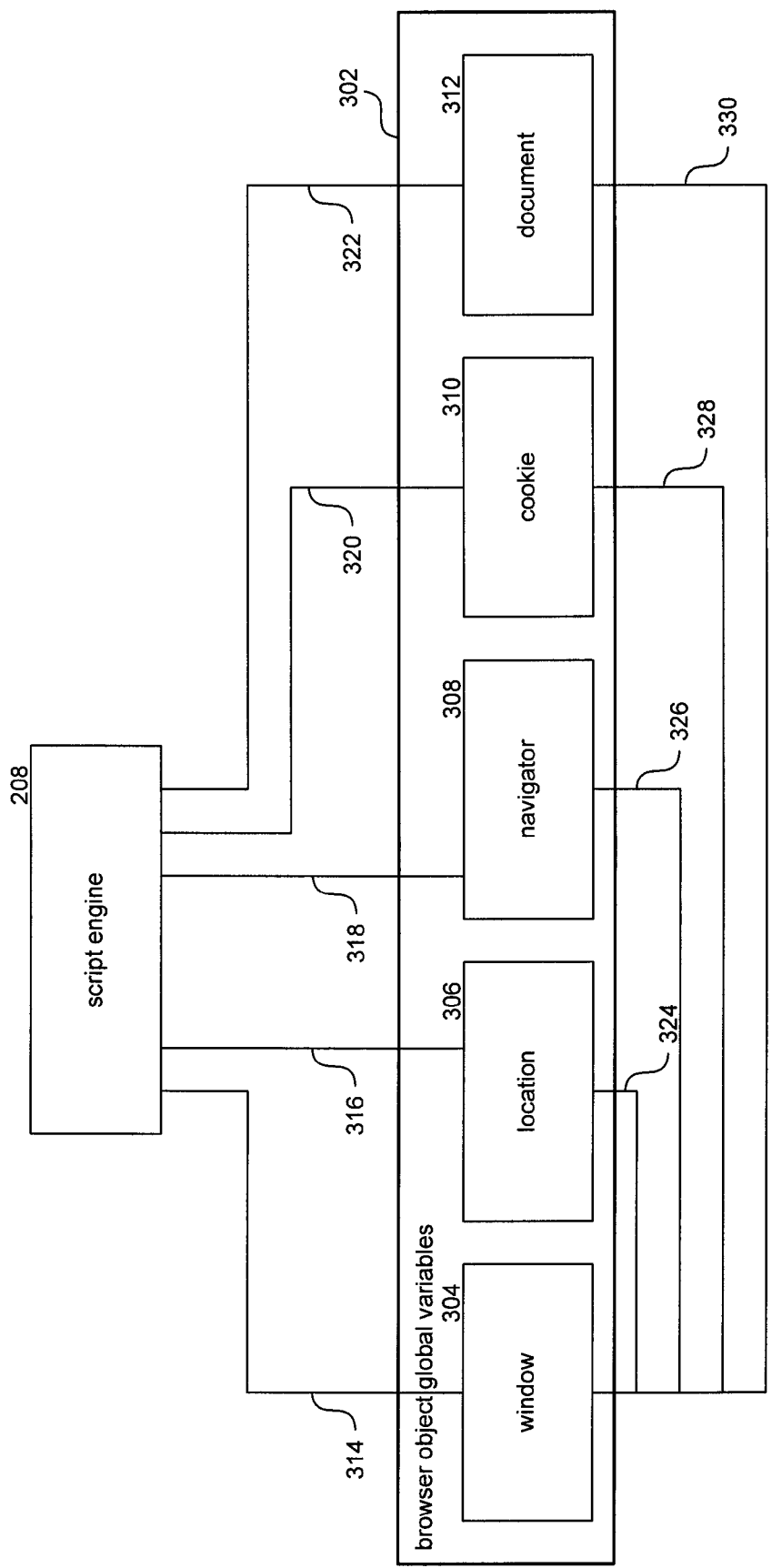
FIG. 3 is a block diagram illustrating components employed by the script engine in various embodiments.

FIG. 3 is a block diagram illustrating components employed by the script engine in various embodiments. When a script engine is employed with an Internet browser at a client computing device, the script engine may employ a framework that provides various browser objects that may be referenced by scripts the script engine executes. Examples of browser objects include Window, Location, Navigator, Cookie, and Document. A framework that is associated with the Internet browser generally provides these browser objects. However, when a script engine is employed outside an Internet browser, these objects may be unavailable. As an example, when the script engine is employed at a server computing device, these browser objects may be unavailable. Nonetheless, scripts that the script engine executes may still reference these browser objects. Accordingly, the facility provides objects that have interfaces that match the browser objects. These emulating objects the facility provides are exposed to scripts as global variables. When a script references an object, the script engine executing the script provides the global variables as a substitute for a framework-provided object. As an example, the script engine 208 provides global variables 302, such as a window 304, location 306, navigator 308, cookie 310, and document 312 global variables. Interfaces 314, 316, 318, 320, and 322 indicate that the global variables are available to the script engine 208. As an example, the window global variable 304 is available via interface 314 to the script engine. When the script engine executes a script that references a window browser object, the script engine employs the window global variable 304 instead. The window global variable 304 can also access the other global variables, such as via interfaces 324, 326, 328, and 330. As an example, when a script references a window.location object, the script engine employs window global variable 304, which can access the location global variable 306 via interface 324. Similarly, the window global variable can access the navigator global variable via interface 326, the cookie global variable 310 via interface 328, and the document global variable 312 via interface 330. By enabling scripts to access the emulating objects by using these global variables, the facility enables client-side scripts to be executed on the server without modification.

In various embodiments, these emulating objects, in addition to providing functionality that are provided by corresponding browser objects they emulate, can also provide other functionality associated with the facility. As an example, an "open" method associated with the window browser object generally receives a URI to indicate a document that should be opened in the new window. Instead of opening a new window, the window object the facility provides can override its open method to instead store the received URI in a list of links that the facility is to crawl. Similarly, other methods provided by the emulating objects that receive URIs store the received URIs in the list of links to crawl instead of (or in addition to) handling the URIs, such as to load a document. Thus, the facility is able to discover URIs that scripts may generate dynamically. Methods provided by objects can equally be referred to as "functions."

Figure 4:
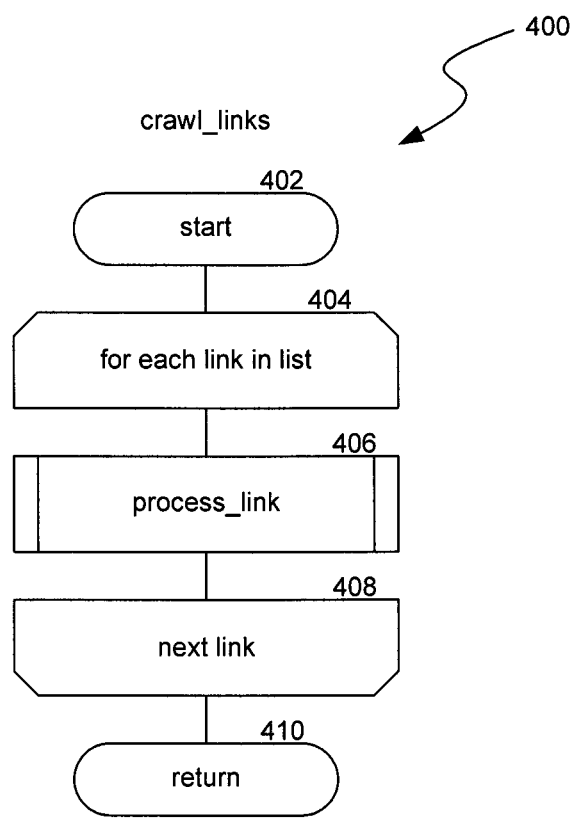
FIG. 4 is a flow diagram illustrating a crawl_links routine invoked by the facility in some embodiments.

FIG. 4 is a flow diagram illustrating a crawl_links routine invoked by the facility in some embodiments. The facility may invoke the crawl_links routine 400 to index text contained by documents referenced by the links, to discover multimedia elements, so forth. The facility may invoke the crawl_links routine from time to time. The facility may also invoke the crawl_links routine when it receives an indication of a new URI. The facility may receive an indication of a URI via an emulating object, a DOM change, and so forth. The facility begins at block 402.

Within the loop of blocks 404-408, the routine processes all links in a list of links that are to be processed (e.g., crawled and indexed). At block 404, the routine selects a link to process. At block 406, the routine invokes a process_link subroutine to process the selected link. The process_link subroutine is described in further detail below in relation to FIG. 5. At block 408, the routine selects another link. If all links have been processed, the routine continues at block 410, where it returns. Otherwise, the routine continues at block 406.

Those skilled in the art will appreciate that the steps shown in FIG. 4 and in each of the flow diagrams discussed below may be altered in a variety of ways. For example, the order of the steps may be rearranged, substeps may be performed in parallel, shown steps may be omitted, other steps may be included, etc.

Figure 5:
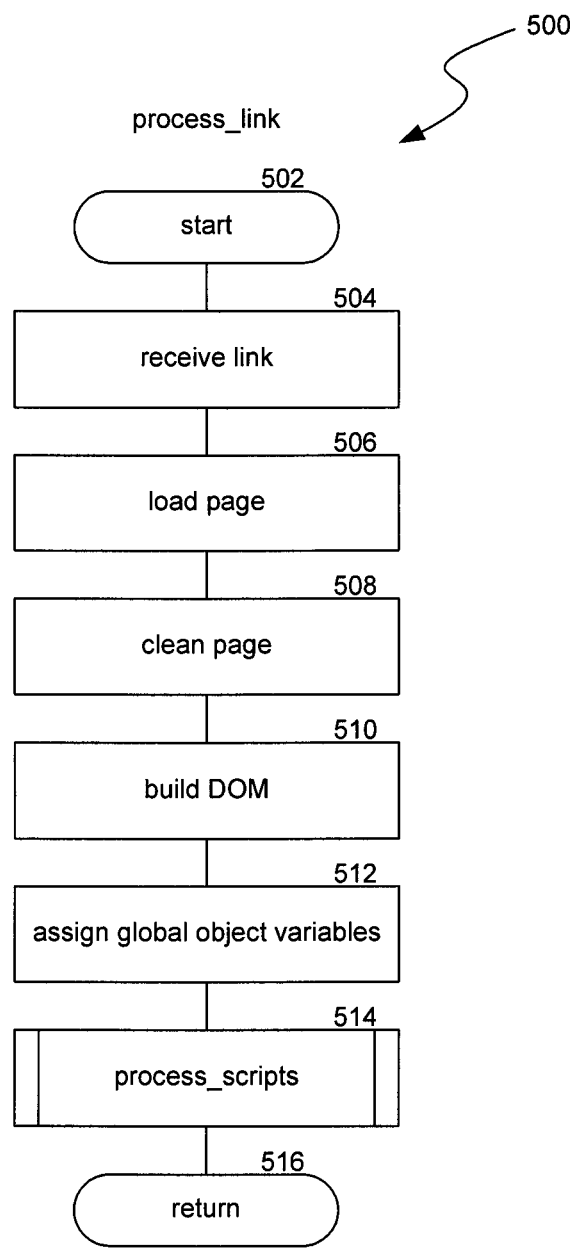
FIG. 5 is a flow diagram illustrating a process_link routine invoked by the facility in some embodiments.

FIG. 5 is a flow diagram illustrating a process_link routine invoked the facility in some embodiments. The process_link routine 500 can be invoked by the crawl_links routine described above in relation to FIG. 4, such as to process an identified link. The routine begins at block 502.

At block 504, the routine receives a link, such as a URI.

At block 506, the routine loads a Web page or other document associated with the received link. The routine can use various protocols to load the document, such as hypertext transfer protocol (HTTP). As an example, the routine may load an HTML page.

At block 508, the routine cleans the page, such as by employing a method provided by a markup language sweeper component 210. The markup language sweeper component can provide a cleaned page, which is equivalent to the loaded page but has been converted into a well-formed document. The markup language sweeper component page converts the loaded document into a well-formed document so that a DOM can be built.

At block 510, the routine builds a DOM based on the cleaned page. As an example, the routine may employ a DOM component 206 to build the DOM.

At block 512, the routine assigns the emulating objects to global variables, such as window, location, navigator, cookie, and document global variables. These variables employ objects the facility provides to emulate browser objects. Because these global variables have similar (e.g., identical) names to the emulated browser objects, scripts can be executed without modification.

At block 514, the routine invokes a process_scripts subroutine to process all the scripts in the loaded page. The process_scripts subroutine is described in further detail below in relation to FIG. 6.

At block 516, the routine returns.

Figure 6:
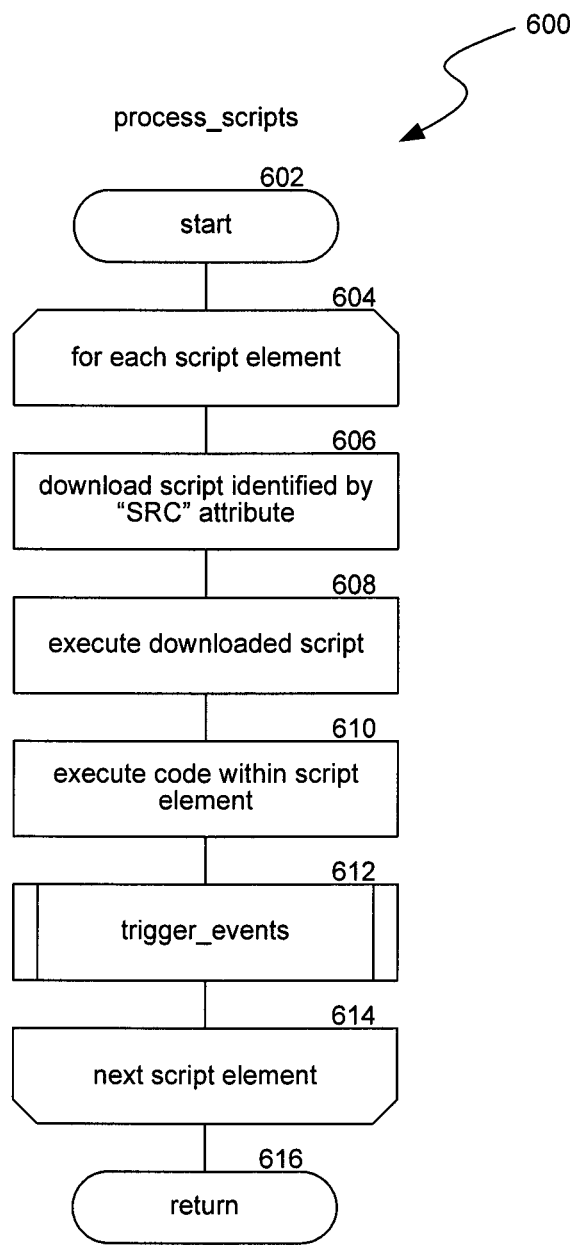
FIG. 6 is a flow diagram illustrating a process_scripts routine invoked by the facility in some embodiments.

FIG. 6 is a flow diagram illustrating a process_scripts routine invoked by the facility in some embodiments. The process_scripts routine 600 may be invoked by the process_link routine described above in relation to FIG. 5, such as to execute scripts contained in or indicated by a loaded page. The process_scripts routine begins at block 602.

Within the loop of blocks 604-614, the routine processes each script element contained in the loaded page. The routine may identify script elements by checking each element in the DOM to determine whether it contains a script tag. At block 604, the routine selects a script element. In some embodiments, the routine processes script elements in the order in which they appear in the loaded page.

At block 606, the routine downloads the script identified by the "SRC" (e.g., "source") attribute of the script tag. As an example, the script tag may indicate that the source of the script is available at an identified URI. In such a case, the routine downloads the script indicated by the URI.

At block 608, the routine executes the downloaded script, such as by using a script engine component 208. Not all script tags may identify scripts that are provided by an identified URI. When a script tag does not indicate a source attribute, the routine may skip the logic of blocks 606 and 608.

At block 610, the routine executes code contained within the script element. As an example, the routine may execute code contained between an opening "<script>" tag and a closing "</script>" tag.

At block 612, the routine invokes a trigger_events subroutine to generate simulated versions of events that can be triggered by user actions or other actions at an Internet browser. The trigger_events subroutine is described below in further detail in relation to FIG. 7.

At block 614, the routine selects another script tag. As an example, the routine may select the next script tag appearing in the loaded Web page. If there are no more script tags to be processed, the routine continues at block 616, where it returns. Otherwise, the routine continues at block 606.

Figure 7:
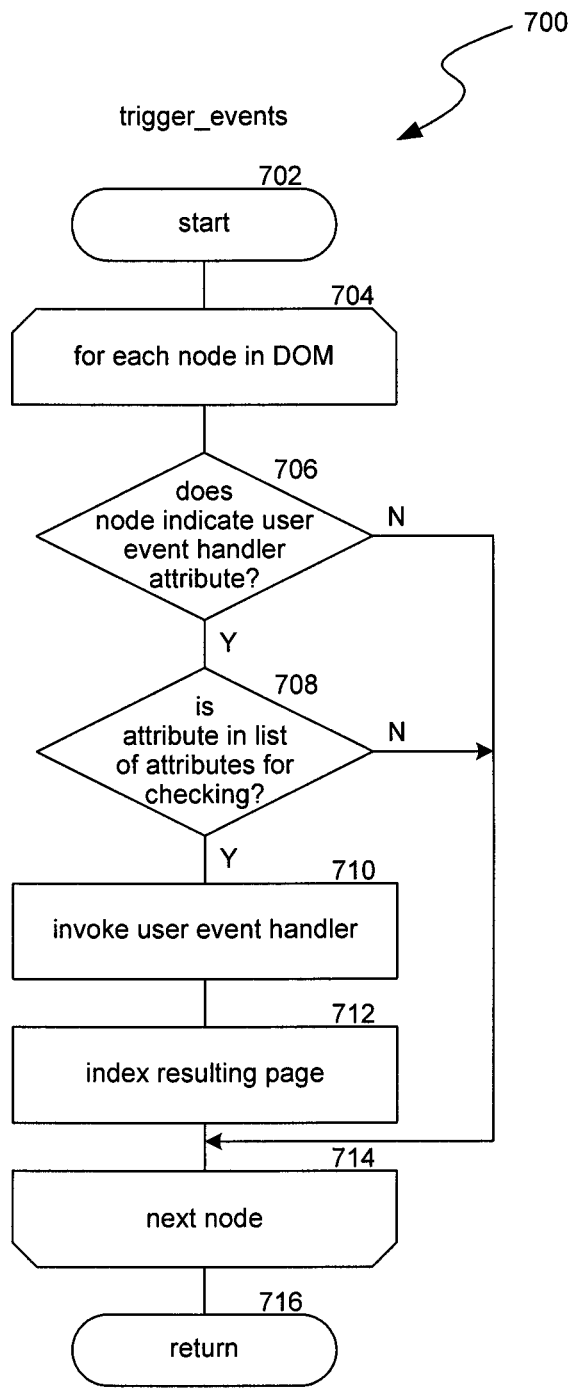
FIG. 7 is a flow diagram illustrating a trigger_events routine invoked by the facility in some embodiments.

FIG. 7 is a flow diagram illustrating a trigger_events routine invoked by the facility in some embodiments. The trigger_events routine 700 may be invoked by the process_scripts routine described above in relation to FIG. 6. The trigger_events routine begins at block 702.

Within the loop of blocks 704-714, the routine causes various events to be triggered. As an example, the routine causes events to be triggered that would normally be associated with user actions. At block 704, the routine selects a node in the DOM. As an example, the routine selects the first node in the DOM.

At decision block 706, the routine determines whether the selected node indicates an event handler attribute. An example of an event handler attribute is "OnClick." When the node indicates an event handler attribute, the routine continues at block 708. Otherwise, the routine continues at block 714.

At decision block 708, the routine determines whether the event handler attribute is in a list of attributes that should be checked. The list may include event handler attributes that are more likely to contain URIs. This list can be changed over time, such as to improve performance. If the event handler attribute is in a list of attributes that should be checked, the routine continues at block 710. Otherwise, the routine continues at block 714.

At block 710, the routine invokes the user event handler identified by the selected node. In some embodiments, the routine may set some variables before invoking the event handler. As an example, if the OnClick routine is associated with multiple entries in a list box, the routine may select an entry from the list box prior to calling the OnClick event handler. Thus, when the event handler is associated with user input, such as a selection from multiple entries in a list box, the routine may invoke the event handler for each of the user inputs. The routine may create a temporary copy of the DOM before setting the variables and invoking the event handler in such a case.

In some embodiments, the routine may set variables using known information. As examples, the routine may set cities, states, countries, postal codes, telephone area codes, dates, etc. when invoking the user event handler. The routine can set variables randomly or iteratively attempt to use known values. In some embodiments, the routine iteratively attempts to use multiple values.

At block 712, the routine indexes the resulting page. As an example, the routine may collect words and URIs appearing on the page and add the words or URIs to a database. When an event handler is invoked, it may change information on the page, such as by creating links dynamically. These dynamically created links may identify additional documents, multimedia elements, and so forth that can be indexed and crawled. Thus, these dynamically created links may also be added to a list of links to be processed.

At block 714, the routine selects another node. As an example, the routine may select the next node in the DOM for processing. If there are no more nodes to be processed, the routine continues at block 716, where it returns. Otherwise, the routine continues at block 706.

Figure 8:
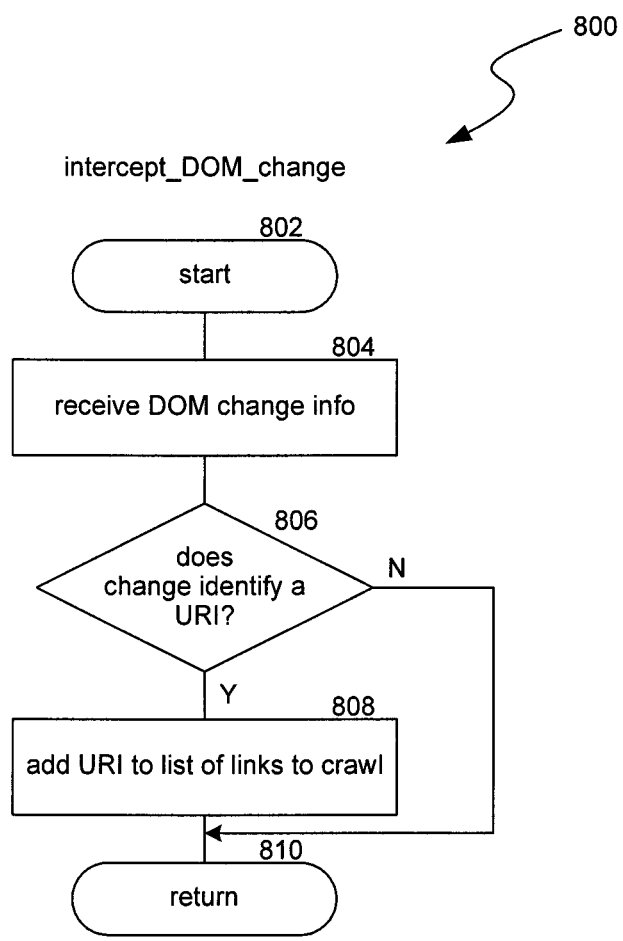
FIG. 8 is a flow diagram illustrating an intercept_DOM_change routine invoked by the facility in some embodiments.

FIG. 8 is a flow diagram illustrating an intercept_DOM_change routine invoked by the facility in some embodiments. The facility may invoke the intercept_DOM_change routine 800 when a URI is added to the DOM, such as by one of the global variables that substitutes for a browser object. A script may add a URI, such as to add a link a user can select after the user provides input. Alternatively, the DOM component, script engine component, or other component may invoke the routine when it intercepts a DOM change. The intercept_DOM_change routine begins at block 802.

At block 804, the routine receives DOM change information. As an example, the routine may receive information relating to a change to the DOM.

At decision block 806, the routine determines whether the received change information identifies a URI. If the change information identifies a URI, the routine continues at block 808. Otherwise, the routine continues at block 810.

At block 808, the routine adds the identified URI to a list of links that the facility is to crawl. The facility may then process the added URI.

At block 810, the routine returns.

It will be appreciated by those skilled in the art that the above-described facility may be straightforwardly adapted or extended in various ways. For example, various script engines, markup language sweeper components, or DOM components may be employed. Moreover, the facility may be adapted for use with various scripting languages. While the foregoing description makes reference to particular embodiments, the scope of the invention is defined solely by the claims that follow and the elements recited therein.

We claim:

1. A method performed by a server computing device for evaluating a client-side script, comprising:
    providing an object that emulates a browser object, the provided object exposing a function for performing steps comprising:
        receiving a first link; and
        storing the received first link in a list of links to be processed;
    receiving a second link to be processed;
    loading a second document identified by the received second link;
    assigning the provided object to a global variable so that a script associated with the loaded second document invokes the function exposed by the provided object instead of a function with a similar name that is exposed by the emulated browser object wherein the function with the similar name exposed by the emulated browser object loads a first document referenced by the received first link upon receiving the first link;
    building a document object model based on the loaded second document;
    employing the built document object model to locate a script element in the loaded second document;
    executing at the server computing device a client-side script defined within the script element;
    detecting an attempt to change the built document object model;
    receiving information relating to the attempted change to the built document object model;
    determining whether the attempted change identifies a link; and
    when the attempted change identifies a link, adding the identified link to a list of links to process.

2. The method of claim 1 further comprising downloading a second client-side script referenced by an attribute of the script element.

3. The method of claim 2 wherein the second client-side script referenced by the attribute of the script element is executed before the client-side script defined within the script element.

4. The method of claim 1 further comprising triggering events.

5. The method of claim 4 wherein the triggering comprises:
    for each node in the document object model,
        determining whether the node indicates an event handler attribute; and
        invoking a user event handler indicated by the event handler attribute.

6. The method of claim 5 further comprising processing the loaded second document.

7. The method of claim 6 wherein the processing includes indexing text stored in the loaded second document.

8. The method of claim 6 wherein the processing includes adding to a list of links to process a link stored in the loaded second document, the link generated dynamically by the client-side script.

9. The method of claim 1 wherein the second link is retrieved from the list of links.

10. A system for evaluating client-side script at a server computing device, comprising:
    a list of links to process, each link identifying a document;
    a document object model component that builds a document object model based on the identified document, locates a script element of the identified document, detects an attempt to change the built document object model, receives information relating to the attempted change to the built document object model, determines whether the attempted change identifies a link, and when the attempted change identifies a link, adds the identified link to a list of links to process; and
    a script engine component operating at the server computing device that, when a link in the list of links is processed, executes a script indicated by the script element of the document identified by a processed link causing a global variable to point to an emulating object that emulates a browser object, the emulating object providing a function with a name that is similar to a corresponding function that is provided by the emulated browser object, wherein the function provided by the emulating object stores a received link in the list of links to process even though the corresponding function that is provided by the emulated browser object handles the received link without storing it in the list of links to process.

11. The system of claim 10 further comprising a markup language sweeper component that transforms the identified document into a well-formed document.

12. The system of claim 10 wherein the script engine processes a client-side script that is written using a language that is similar to a JavaScript language.

13. The system of claim 10 wherein the received link is dynamically generated by the script.

14. The system of claim 10 wherein the emulating object emulates a window, location, navigator, cookie, or document browser object.

15. The system of claim 10 wherein the script employs the global variable as a substitute for the browser object without a change in the script.

16. A non-transitory computer-readable storage medium having computer-executable instructions that, when executed, cause a server computing system to perform a method of evaluating a client-side script, the method comprising:
- providing an emulating object that emulates a browser object;
- receiving from a list of links a link that is to be processed;
- loading a document identified by the received link;
- assigning the emulating object to an identifier so that a script identified by the loaded document invokes a function exposed by the emulating object instead of a corresponding function with a similar name that is exposed by the emulated browser object wherein the function with the similar name exposed by the emulated browser object handles a link it receives as a parameter but the function exposed by the emulating object stores in the list of links to be processed the link it receives as a parameter without handling the link;
- building a document object model based on the loaded document;
- employing the built document object model to locate a script element in the loaded document;
- executing at the server computing device a client-side script defined within the script element;
- detecting an attempt to change the built document object model;
- receiving information relating to the attempted change to the built document object model;
- determining whether the attempted change identifies a link; and
- when the attempted change identifies a link, adding the identified link to a list of links to process.

17. The computer-readable medium of claim 16 wherein handling a link includes loading a document referenced by the link.

* * * * *